United States Patent
Kumar et al.

(10) Patent No.: US 10,857,954 B1
(45) Date of Patent: Dec. 8, 2020

(54) CLIP ASSEMBLIES

(71) Applicant: Toyota Motor Engineering & Manufacturing North America, Inc., Plano, TX (US)

(72) Inventors: Praveen Kumar, Ann Arbor, MI (US); Joshua S. Lynch, Temperance, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/524,644

(22) Filed: Jul. 29, 2019

(51) Int. Cl.
*B60R 13/02* (2006.01)
*F16B 2/22* (2006.01)

(52) U.S. Cl.
CPC ............ *B60R 13/0243* (2013.01); *F16B 2/22* (2013.01)

(58) Field of Classification Search
CPC ... B60R 13/0243; B60R 13/0206; F16B 2/22; Y10T 24/309; Y10T 24/45105
See application file for complete search history.

(56) References Cited

U.S. PATENT DOCUMENTS

| 4,593,441 | A | * | 6/1986 | St. Louis | ............. | F16B 5/0614 |
| | | | | | | 24/295 |
| 5,699,601 | A | * | 12/1997 | Gilliam | .................. | B25B 27/00 |
| | | | | | | 29/278 |
| 5,931,514 | A | * | 8/1999 | Chung | .................... | F16B 12/26 |
| | | | | | | 292/89 |
| 8,943,655 | B2 | * | 2/2015 | Kabeya | ............... | B60R 11/0217 |
| | | | | | | 24/453 |
| 9,914,406 | B1 | | 3/2018 | Hemker | | |
| 2016/0236592 | A1 | * | 8/2016 | Peniche | ............... | B60N 2/0725 |

FOREIGN PATENT DOCUMENTS

| CN | 203528267 U | 4/2014 |
| DE | 3441350 C1 | 5/1986 |
| DE | 3601891 C2 | 2/1989 |
| DE | 102006002815 A1 | 7/2007 |
| JP | 2001231133 A | 8/2001 |
| JP | 5698174 B2 | 4/2015 |
| JP | 2015193279 A | 11/2015 |
| WO | 2018009288 A1 | 1/2018 |

\* cited by examiner

*Primary Examiner* — Robert Sandy
(74) *Attorney, Agent, or Firm* — Dinsmore & Shohl LLP

(57) ABSTRACT

A clip assembly includes a mating component that includes including a mating opening. The clip assembly may also include an attachment component that includes a base wall, a clip body, a pair of sidewalls, an end wall, and a base aperture formed in the base wall. The end walls extend between the pair of sidewalls such that the pair of sidewalls and the end wall at least partially bound the base aperture. The clip body connects with the pair of sidewalls, and the clip body includes an engagement member configured to engage with the mating opening of the mating component to releasably couple the attachment component with the mating component.

10 Claims, 3 Drawing Sheets

CLIP ASSEMBLIES

TECHNICAL FIELD

The present specification generally relates to clip assemblies and, more particularly, clip assemblies for securing attachment components of the clip assemblies to mating components of the clip assemblies.

BACKGROUND

In the automotive industry, one or more molded-in clips may be utilized in order to couple, for example, a door panel of a vehicle to a frame of the vehicle. Conventional molded-in clips may utilize a doghouse on an attachment component to attach a mating component to the attachment component. However, forming conventional molded-in clips utilizes a complicated manufacturing process that requires mold tooling having sliders and/or lifters and applies stress directly to the attachment component. Additionally, conventional molded-in clips may inefficiently translate stress resulting from a bending of a snap tab of the clip assembly.

Accordingly, a need exists for alternative clip assemblies for securing an attachment component to a mating component.

SUMMARY

In one embodiment, a clip assembly includes a mating component including a mating opening. The clip assembly may also include an attachment component that includes a base wall, a clip body, a pair of sidewalls, an end wall, and a base aperture formed in the base wall. The end walls extend between the pair of sidewalls such that the pair of sidewalls and the end wall at least partially bound the base aperture. The clip body connects with the pair of sidewalls, and the clip body includes an engagement member configured to engage with the mating opening of the mating component to releasably couple the attachment component with the mating component.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
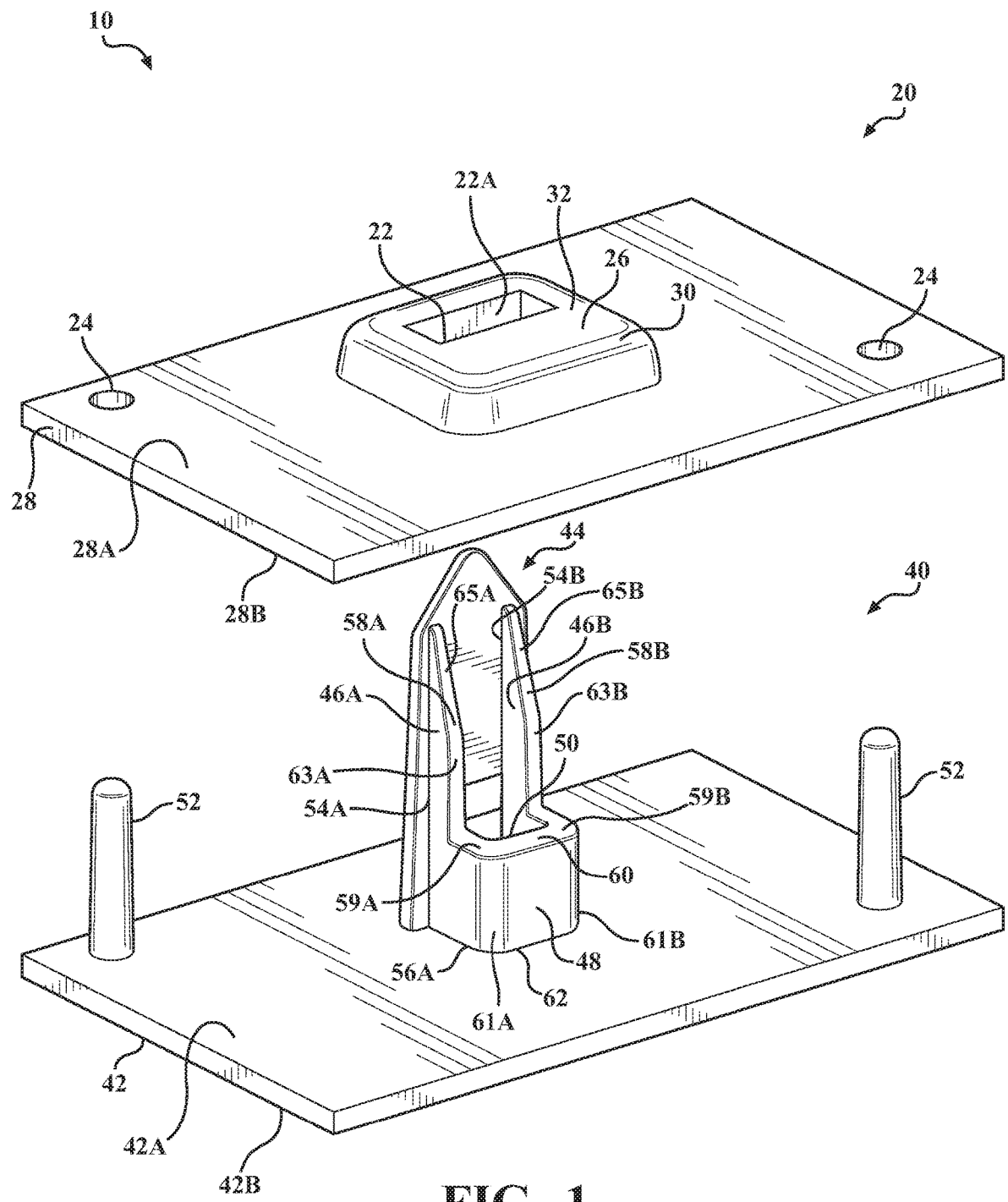
FIG. 1 schematically depicts an exploded perspective view of a clip assembly, according to one or more embodiments shown and described herein.

FIG. 1 generally depicts one embodiment of a clip assembly that includes an attachment component and a mating component. The clip assembly initially translates stress, which is generated by flexing an engagement member of a clip body of the clip assembly, through the clip body of the attachment component. Subsequently, the stress is distributed to a pair of sidewalls and a base wall of the attachment component. Various embodiments of the clip assembly will be described in more detail herein.

Referring to FIG. 1, a clip assembly is generally illustrated at 10. The clip assembly 10 includes a mating component 20 and an attachment component 40. The mating component 20 includes a main wall 28 having a first surface 28A and an opposite second surface 28B. The main wall 28 may also include a mating opening 22 defined by an inner wall 22A. The main wall 28 may also include at least one auxiliary opening 24, and an elevated portion 26.

The elevated portion 26 extends outwardly from the first surface 28A of the main wall 28. The elevated portion 26 includes a curved portion 30 and a flat portion 32. The curved portion 30 is disposed between the flat portion 32 and the first surface 28A of the main wall 28. The flat portion 32 is spaced apart from the first surface 28A of the main wall 28. The curved portion 30 connects the flat portion 32 with the first surface 28A of the main wall 28. In some embodiments, the mating opening 22 is disposed within the flat portion 32 of the elevated portion 26.

The at least one auxiliary opening 24 vertically extends through the main wall 28. Specifically, the at least one auxiliary opening 24 extends between the first surface 28A and the second surface 28B. The at least one auxiliary opening 24 may have a circular or substantially circular geometry.

Figure 2:
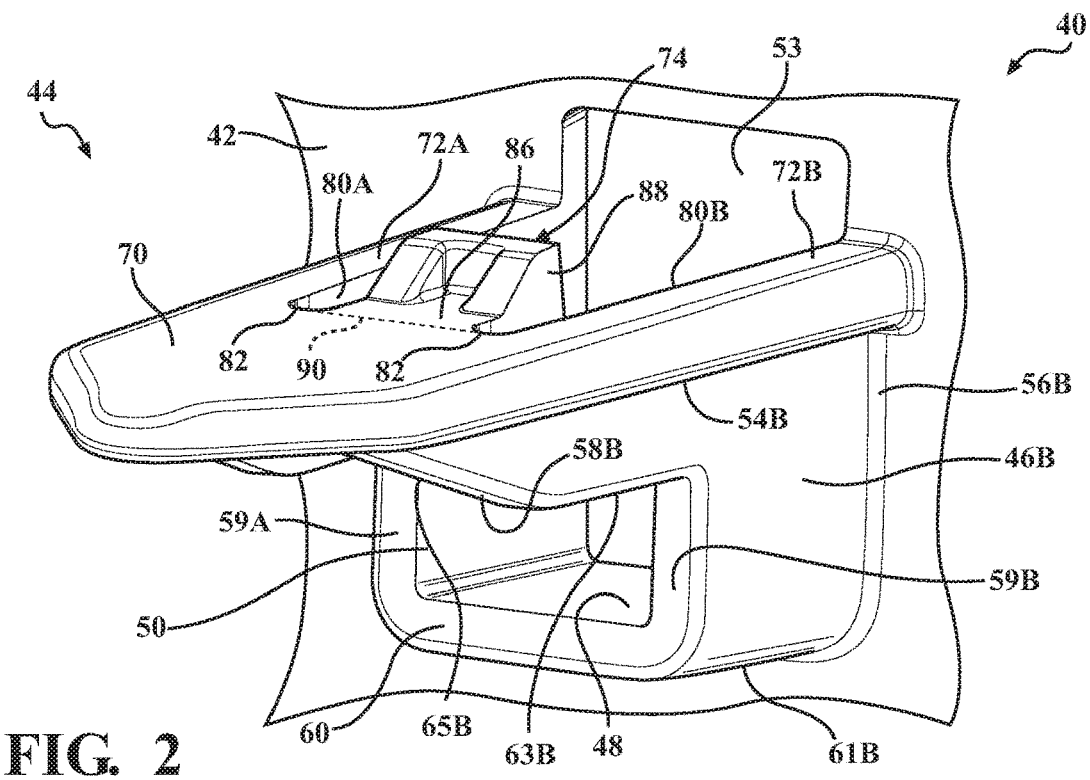
FIG. 2 schematically depicts a perspective view of an attachment component of the clip assembly of FIG. 1, according to one or more embodiments shown and described herein.

Referring to FIGS. 1 and 2, the attachment component 40 includes a base wall 42 having a first surface 42A and an opposite second surface 42B, a clip body 44, a pair of sidewalls 46A, 46B, an end wall 48, a clip body aperture 50, at least one auxiliary engagement member 52, and a base aperture 53.

The pair of sidewalls 46A, 46B each include respective upper attachment edges 54A, 54B. The upper attachment edge 54A connects sidewall 46A to the clip body 44, and the upper attachment edge 54B connects sidewall 46B to the clip body 44. The pair of sidewalls 46A, 46B each include respective wall attachment edges 56A, 56B. The wall attachment edge 56A is generally perpendicular to the upper attachment edge 54A, and the wall attachment edge 56B is generally perpendicular to the upper attachment edge 54B. The wall attachment edge 56A connects the sidewall 46A to the first surface 42A of the base wall 42, and the wall attachment edge 56B connects the sidewall 46B to the first surface 42A of the base wall 42. The sidewalls 46A, 46B extend outwardly from the first surface 42A of the base wall 42.

The pair of sidewalls 46A, 46B each include respective nonlinear edges 58A, 58B, distal edges 59A, 59B, and extended edges 61A, 61B. The nonlinear edge 58A includes straight portion 63A and inclined portion 65A, and the nonlinear edge 58B includes straight portion 63B and inclined portion 65B. The inclined portion 65A connects the upper attachment edge 54A with the straight portion 63A, and the inclined portion 65B connects the upper attachment edge 54B with straight portion 63B.

The distal edge 59A connects the straight portion 63A of the nonlinear edge 58A to the extended edge 61A, and the distal edge 59B connects the straight portion 63B of the nonlinear edge 58B to the extended edge 61B. The extended edges 61A, 61B, which extend outwardly from the first surface of the base wall 42, connect the end wall 48 to the pair of sidewalls 46A, 46B.

The end wall 48 includes a distal edge 60 and a base edge 62. The end wall 48 is connected to the base wall 42 via the base edge 62 such that the end wall 48 extends outwardly from the first surface 42A of the base wall 42. The end wall 48 extends between the pair of sidewalls 46A, 46B such that the pair of sidewalls 46A, 46B and the end wall 48 at least partially bound the clip body aperture 50 and/or the base aperture 53.

The at least one auxiliary engagement member 52 extends outwardly from the first surface 42A of the base wall 42. As will be described in greater detail below, a location of the at least one auxiliary engagement member 52 is positioned to correspond to a location of the at least one auxiliary opening 24. In some embodiments, the at least one auxiliary engagement member 52 has a shape that corresponds to a shape of the at least one auxiliary opening 24 such that the at least one auxiliary engagement member 52 is configured to be received within the at least one auxiliary opening 24. In some other embodiments, the at least one auxiliary engagement member 52 may have a shape different from the shape of the at least one auxiliary opening 24 provided that the shape of the at least one auxiliary engagement member 52 is configured to be received within the shape of the at least one auxiliary opening 24.

In one embodiment, the base aperture 53 extends between the first surface 42A and the second surface 42B of the base wall 42. The base aperture 53 is bound on three sides by the sidewalls 46A, 46B and the end wall 48. Specifically, the wall attachment edge 56A of the sidewall 46A is provided on one side of the base aperture 53 and the wall attachment edge 56B of the sidewall 46B is provided on an opposite of the base aperture 53 from the wall attachment edge 56A. The base edge 62 of the end wall 48 extends between the wall attachment edge 56A and the wall attachment edge 56B. As will be described in greater detail below, the base aperture 53 is in communication with the clip body aperture 50.

Figure 3:
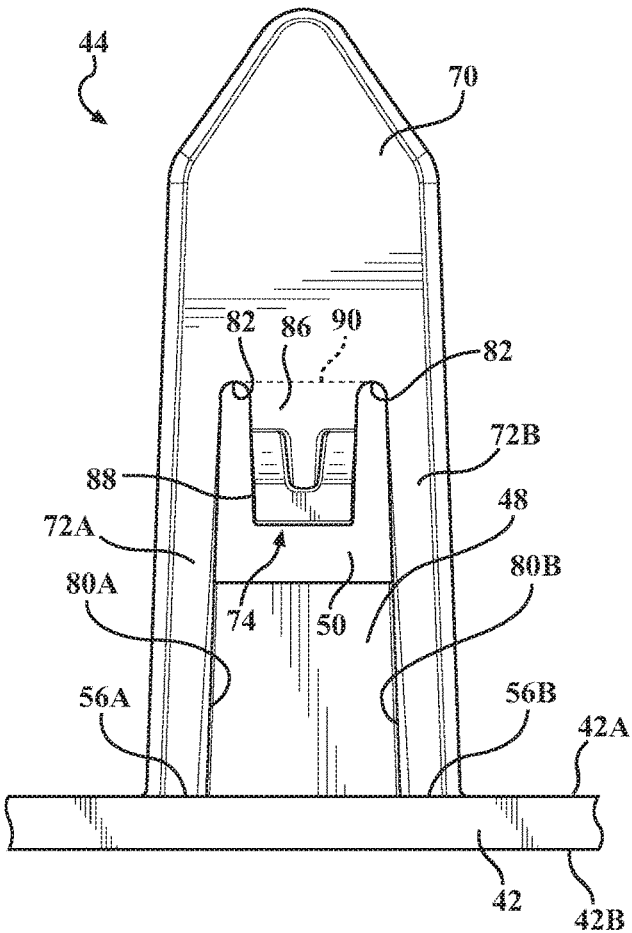
FIG. 3 schematically depicts a top view of the attachment component of the clip assembly of FIG. 1, according to one or more embodiments shown and described herein.

Referring now to FIGS. 2 and 3, the clip body 44 includes a main body 70, a pair of spaced apart legs 72A, 72B, and an engagement member 74.

The pair of legs 72A, 72B extend outwardly from the base wall 42. Leg 72A includes an inner edge 80A, and leg 72B includes an inner edge 80B. The main body 70 includes a pair of interior edges 82. The inner edge 80A is connected to an outer edge of one of the pair of interior edges 82, and the inner edge 80B is connected to an outer edge of the other of the pair of interior edges 82. The inner edges 80A, 80B and the pair of interior edges 82 define a portion of the clip body aperture 50, and the distal edges 59A, 59B of the sidewalls 46A, 46B, and the distal edge 60 of the end wall 48 define another portion of the clip body aperture 50.

The engagement member 74 extends outwardly between the pair of interior edges 82 of the main body 70 and into the clip body aperture 50. The engagement member 74 is positioned between the inner edges 80A, 80B of the pair of legs 72A, 72B. In one embodiment, the engagement member 74 is a snap tab that includes a base portion 86 and an inclined tab portion 88. The base portion 86 extends outwardly from the interior edge 82 of the main body 70. The inclined tab portion 88 extends outwardly from the base portion 86 at an acute inclination angle with respect to a surface of the base portion 86. In some embodiments, the acute inclination angle is 30°±5°, 45°±5°, or 55°±5°.

Figure 4A:
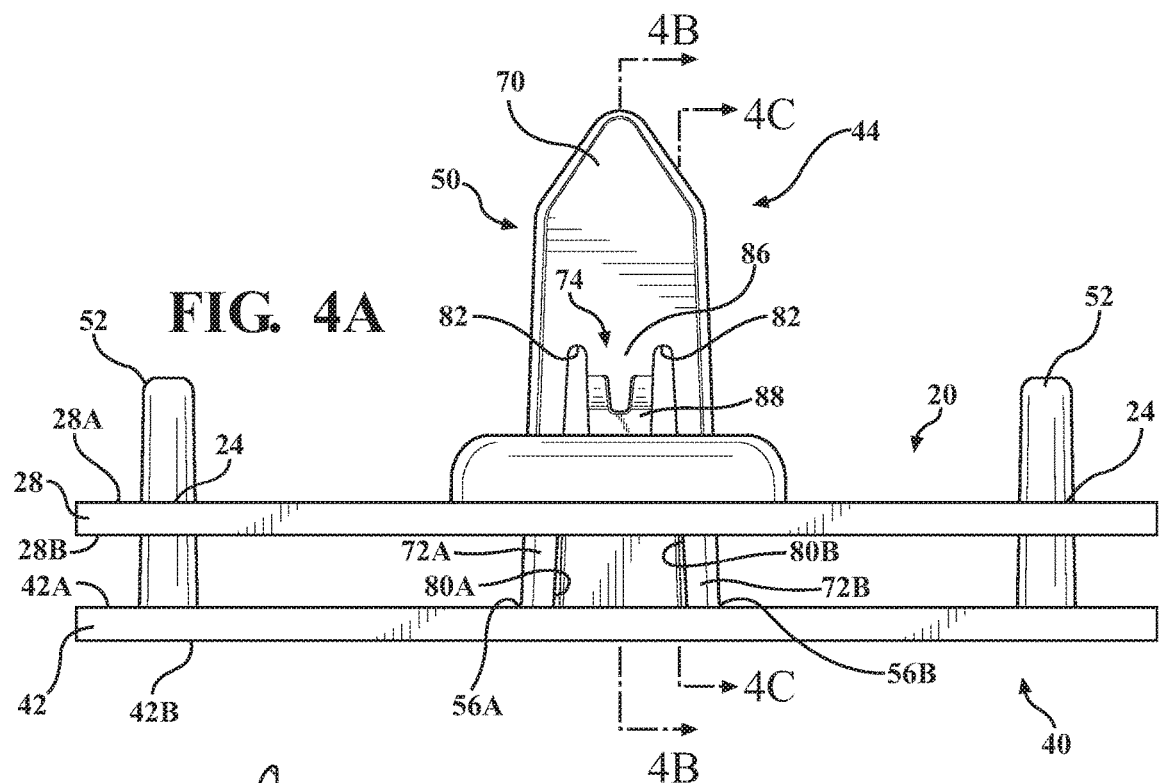
FIG. 4A schematically depicts a top view of the clip assembly with the attachment component engaged with the mating component of FIG. 1, according to one or more embodiments shown and described herein.
Figure 4B:
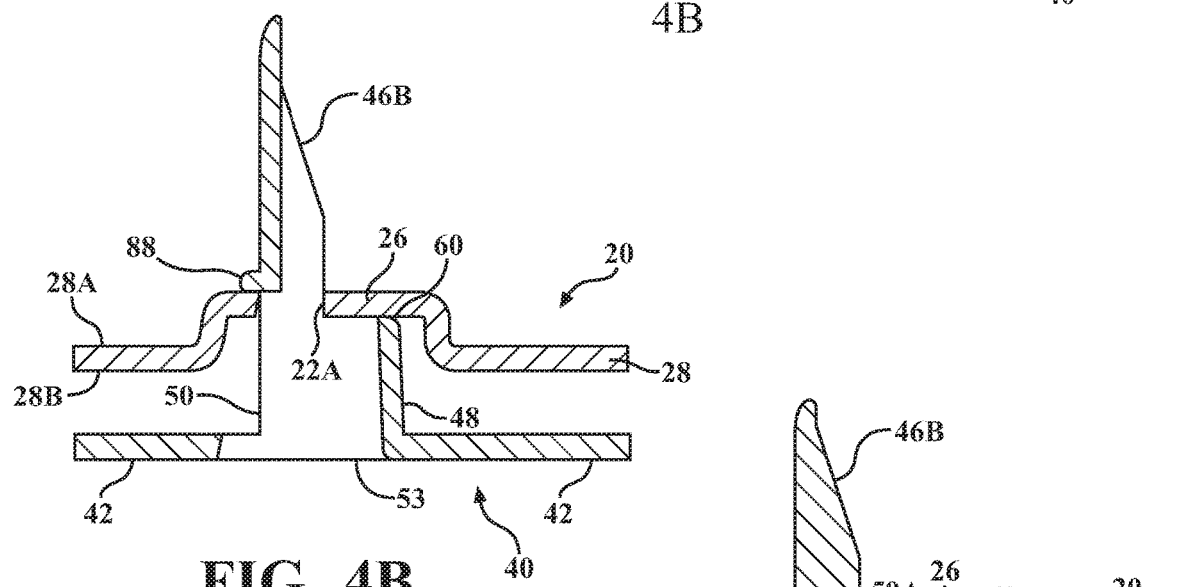
FIG. 4B schematically depicts a cross-sectional view of the clip assembly taken along the line 4B-4B of FIG. 4A, according to one or more embodiments shown and described herein.
Figure 4C:
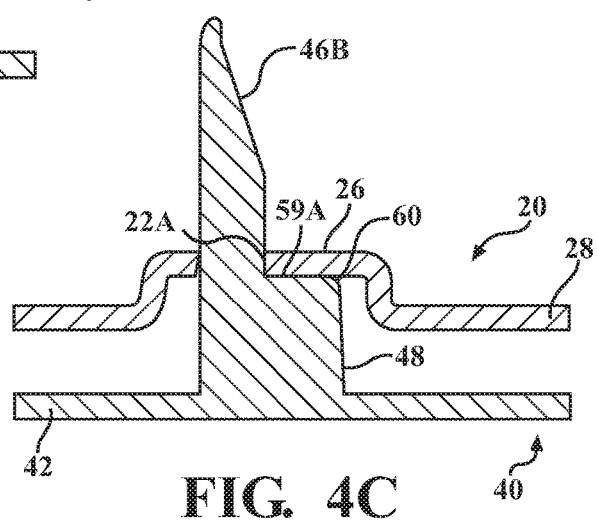
FIG. 4C schematically depicts a cross-sectional view of the clip assembly taken along the line 4C-4C of FIG. 4A, according to one or more embodiments shown and described herein.

Referring now to FIGS. 4A-4C, the attachment component 40 engaged with the mating component 20 are shown. In one embodiment, the engagement member 74 is configured to engage with the mating opening 22 of the mating component 20 to releasably couple the attachment component 40 with the mating component 20. Additionally, each of the at least one auxiliary engagement member 52 of the attachment component 40 may engage with one of the at least one auxiliary opening 24 in order to further reinforce the engagement between the attachment component 40 and the mating component 20.

In one embodiment, the attachment component 40 engages with the mating component 20 when the clip body 44 of the attachment component 40 is inserted into the mating opening 22 of the mating component 20. As the clip body 44 is inserted into the mating opening 22, the engagement member 74 contacts the inner wall 22A of the mating opening 22. As an example, the inclined tab portion 88 of the engagement member 74 initially contacts the inner wall 22A of the mating opening 22 as the clip body 44 is inserted into the mating opening 22. Once the inclined tab portion 88 of the engagement member 74 initially contacts the inner wall 22A of the mating opening 22, the engagement member 74 begins to deflect toward the clip body aperture 50.

The engagement member 74 may deflect toward the clip body aperture 50 with respect to a surface of the base portion 86. As an example and as schematically depicted in FIG. 3, the engagement member 74 is configured to deflect toward the clip body aperture 50 along deflection line 90 positioned at the junction of the engagement member 74 and the interior edge 82 of the main body 70.

Referring back to FIGS. 4A-4C, as the clip body 44 is inserted into the mating opening 22, an amount of deflection of the engagement member 74 increases. Specifically, as the clip body 44 is inserted into the mating opening 22 of the mating component 20, the inner wall 22A of the mating opening 22 slides along the inclined tab portion 88 of the engagement member 74. As the inner wall 22A of the mating opening 22 slides further along the inclined tab portion 88 of the engagement member 74 and further away from the deflection line 90, an applied force to the inclined tab portion 88 increases, thereby causing the engagement member 74 deflects further toward the clip body aperture 50.

When the engagement member 74 is deflected such that the inclined tab portion 88 is coplanar or substantially coplanar to the base portion 86 of the engagement member 74, the engagement member 74 can be inserted beyond the mating opening 22 of the mating component 20. Once the engagement member 74 is inserted beyond the mating opening 22, the engagement member 74 returns to its original position and is no longer deflected toward the clip body aperture 50, as illustrated in FIG. 4B. Consequently, the attachment component 40 is engaged with the mating component 20 once the engagement member 74 is inserted beyond the mating opening 22 of the mating component 20.

Upon engagement of the attachment component 40 to the mating component 20, the inclined tab portion 88 of the engagement member 74 abuts the first surface 28A of the mating component 20. Specifically, the inclined tab portion 88 of the engagement member 74 abuts the elevated portion 26 of the mating component 20, as illustrated in FIG. 4B. As schematically depicted in FIG. 4C, upon engagement of the attachment component 40 to the mating component 20, the distal edges 59A, 59B of the pair of sidewalls 46A, 46B, and the distal edge 60 of the end wall 48 abut the second surface 28B of the mating component 20. Specifically, the distal edges 59A, 59B of the pair of sidewalls 46A, 46B, and the distal edge 60 of the end wall 48 abut a portion of the second surface 28B of the main wall 22 adjacent the mating opening 22. Accordingly, the inclined tab portion 88 of the engagement member 74, the distal edges 59A, 59B of the pair of sidewalls 46A, 46B, and the distal edge 60 of the end wall 48 are configured to securely retain the engagement between the mating component 20 and the attachment component 40.

In one embodiment, the clip assembly 10 is utilized to attach a door panel of a vehicle to a frame of the vehicle. However, one of ordinary skill in the art may use the clip assembly 10 to connect various different components and, therefore, the clip assembly 10 is not limited to attaching a door panel of a vehicle to a frame of a vehicle. In other embodiments, the clip assembly 10 is utilized to releasably attach one component to another component.

While the clip body 44 of the attachment component 40 is being inserted into the mating opening 22, the stress due to the deflection of the engagement member 74 is transferred to the base wall 42 through the pair of sidewalls 46A, 46B and the end wall 48. By distributing the stress due to the deflection across various components of the attachment component 40, the clip assembly 10 is less prone to being damaged while the engagement member 74 is deflected. Accordingly, the improved stress distribution improves the mechanical robustness of the clip assembly 10.

Once the attachment component 40 is engaged with the mating component 20, the inclined tab portion 88 abuts the first surface 28A of the mating component 20, and the distal edges 59A, 59B of the pair of sidewalls 46A, 46B, and the distal edge 60 of the end wall 48 abut the second surface 28B of the mating component 20. Accordingly, the engagement between the attachment component 40 and the mating component 20 is secure, and a probability of the attachment component 40 and the mating component 20 separating due to, for example, vibrations or other similar forces, decreases. Accordingly, the secure coupling between the attachment component 40 and the mating component 20 improves the mechanical robustness of the clip assembly 10.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A clip assembly comprising:
   a mating component including a mating opening;
   an attachment component that includes a base wall, a clip body, a pair of sidewalls, an end wall, and a base aperture formed in the base wall, the end wall extends between the pair of sidewalls such that the pair of sidewalls and the end wall at least partially bounds the base aperture, the clip body connects with the pair of sidewalls, the clip body includes an engagement member configured to engage with the mating opening of the mating component to releasably couple the attachment component with the mating component.

2. The clip assembly of claim 1, wherein the clip body includes a main body and a pair of spaced apart legs, the pair of spaced apart legs extending outwardly from the base wall, each of the pair of spaced apart legs including an inner edge, and the main body includes an interior edge, the interior edge and the inner edges of the pair of spaced apart legs defines a clip body aperture.

3. The clip assembly of claim 2, wherein the clip body aperture is in communication with the base aperture.

4. The clip assembly of claim 3, wherein the engagement member extends outwardly from the interior edge of the main body into the clip body aperture.

5. The clip assembly of claim 4, wherein the engagement member is positioned between the inner edges of the pair of spaced apart legs.

6. The clip assembly of claim 5, wherein the engagement member is a snap tab configured to engage with the mating opening of the mating component to releasably couple the attachment component with the mating component.

7. The clip assembly of claim 6, wherein upon engagement of the snap tab with the mating opening, the snap tab is configured to deflect at a deflection line positioned at a junction of the snap tab and the interior edge of the main body.

8. The clip assembly of claim 7, wherein a stress due to a deflection of the snap tab at the deflection line is transferred to the base wall through the pair of sidewalls and the end wall.

9. The clip assembly of claim 8, wherein the snap tab includes a base portion and an inclined tab portion, the base portion extending outwardly from the interior edge of the main body, and the inclined tab portion extends outwardly from the base portion.

10. The clip assembly of claim 9, wherein upon engagement of the attachment component to the mating component, a distal edge of the pair of sidewalls and the end wall abuts a portion of the mating component adjacent the mating opening.

* * * * *